Dec. 18, 1934. C. C. BENNETT Re. 19,398

AXLE TWISTING DEVICE

Original Filed Oct. 22, 1930 2 Sheets-Sheet 1

Inventor

Claude C. Bennett

By Charles L. Reynolds

Attorney

Dec. 18, 1934. C. C. BENNETT Re. 19,398

AXLE TWISTING DEVICE

Original Filed Oct. 22, 1930 2 Sheets-Sheet 2

Inventor

Claude C. Bennett

By Charles L. Reynolds

Attorney

Reissued Dec. 18, 1934

Re. 19,398

UNITED STATES PATENT OFFICE 19,398

AXLE TWISTING DEVICE

Claude C. Bennett, Seattle, Wash., assignor to A. E. Feragen, Inc., Seattle, Wash., a corporation of Washington Original No. 1,818,680, dated August 11, 1931, Serial No. 490,455, October 22, 1930. Application for reissue August 9, 1933, Serial No. 684,440

12 Claims. (Cl. 153—78)

My invention is directed to the provision of a means whereby axles may be twisted, within a short distance, for the purpose of adjusting caster.

My invention is particularly useful upon Ford automobiles of the Model A type, which are provided with a front axle of general I-beam section, which is curved or inclined upwardly at its ends, and which has a vertical aperture for the spring perch bolt a short distance inward of the end, which end is vertically apertured to receive the king pin bolt. It is, however, applicable to many other axles. In cars which are provided with longitudinally extending springs, seating upon a pad at the upper side of the axle, it is a simple matter to adjust for caster by the provision of tapered shims, but this is not possible in the Ford Model A type of spring suspension, wherein the spring extends transversely of the car, and is supported from the axle by spring-perch bolts extending therethrough. It is not desirable to throw the entire axle forwardly to adjust for caster, as this disturbs the spring suspension and tends to bend the spring perch bolt, but there are many times when it is desirable to adjust the caster or inclination of the king pin, and this must be done without disturbing the setting of the spring perch bolts. My invention is particularly designed to provide a means whereby the axle may be twisted between these two bolts to provide the proper caster setting for the king pin bolts.

My general object is as brought out above, and in association therewith it is also my object to provide a device of this general character which is of simple construction, easily applied and removed, applicable to axles of different sizes and shapes, and which can be operated by means of standard hydraulic jacks, such as are supplied with other types of axle-setting equipment, to the end that the shop using this particular piece of equipment will not be under the necessity of purchasing a jack if it already has other axle-setting equipment.

The space between the spring-perch bolt and the king pin bolt in all cars is limited, and in Ford cars it is especially restricted by the location of the steering arm, brake mechanism, and spring-perch bolt itself. It is a further object, therefore, to provide a device for twisting axles, and particularly applicable to Ford cars, which is properly operable within the restricted space available.

Furthermore, it is an object to provide such a device which does not require careful adjustment to position, such adjustment being difficult in a restricted space, but which merely requires that two axle-engaging heads come into contact along a common plane, which heads when so positioned will of necessity and by reason of their shape exert a shearing stress on one flange of the axle (usually the lower flange), and will be spaced apart where they engage the opposite, upper, flange, to leave a space where twisting will occur. The axle is sufficiently tough, of course, that the shearing stress will not affect it. An associated object is to distribute the stresses of the fulcra of the levers used, along the lower flange of the axle, in such manner that the levers themselves will not tend to twist nor slip sidewise along the axle, one relative to the other.

It is also an object, when employing two levers as the twisting elements, to so form them at their ends distant from the axle that a jack or like force-applying means will exert its force in a plane either coincident with or parallel and closely adjacent to the common plane of contact, referred to above, whereby the entire force of the jack is usefully applied, and has no portion wasted in producing or in tending to produce sidewise slippage of the levers, and whereby no means are necessary to hold the levers against twisting on the axle or sidewise slippage, other than their mere contact along a considerable length of the lower flange of the axle at each side of their common plane of contact, as referred to above.

My invention comprises the novel parts and the novel combination and arrangement thereof, as shown in the accompanying drawings, described in this specification, and as will be more particularly defined by the claims which terminate the same.

In the accompanying drawings, I have shown my invention in a form which is now preferred by me, it being understood that various changes in the form and arrangement may be made within the scope of the appended claims.

Figure 1:
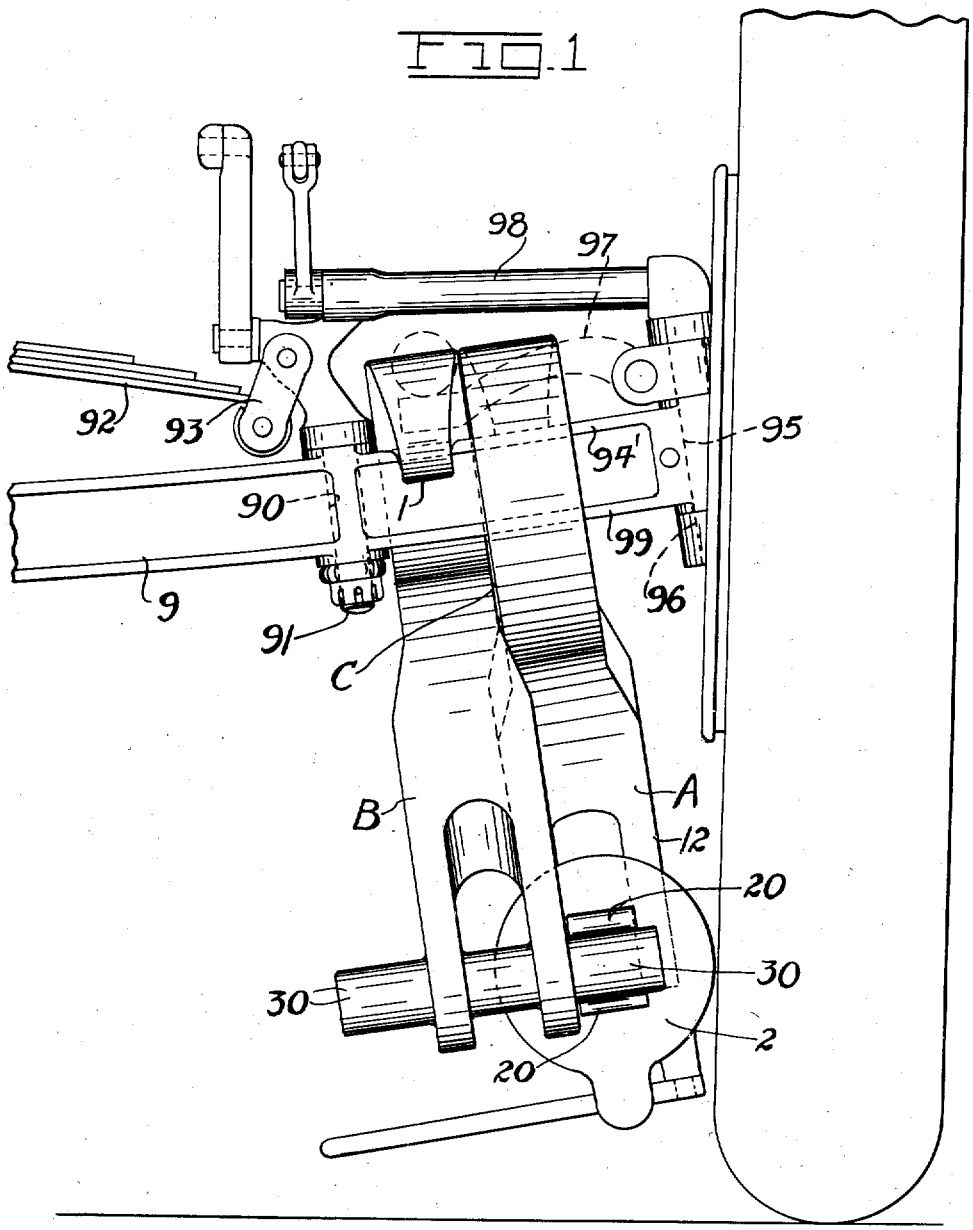
Figure 1 is an elevation of my device from the front of the car, showing the same in place on the axle.

The invention will be best understood by reference to an axle of the type employed in the Ford Model A, and will be explained in conjunction therewith, remembering that it is equally applicable to other types of axle. This axle, generally designated by the numeral 9, is provided with the nearly vertical aperture 90 for the reception of the spring perch bolt 91, at the upper end of which is supported one end of the transverse spring 92. Ordinarily a spring shackle 93 forms the means of supporting the spring from the spring perch bolt. The axle 9 is also apertured at its end, as indicated at 95, for the reception of a king pin bolt 96, to the upper end of which is secured the steering arm, indicated at 97.

It is desirable that twisting of the axle occur between the apertures 90 and 95, as has been explained, and the space between them is not great, and moreover, is restricted by means of the steering arm 97, a brake-operating shaft and casing, indicated at 98, and like devices. The means I have provided for this twisting operation comprises two axle-engaging members complemental to each other and of generally planiform shape, adapted to lie substantially in contact with one another, but spaced slightly along the axle, together with means to apply a force to these axle-engaging members to accomplish relative angular movement thereof, in a plane or planes substantially normal to the axle, such means conveniently being an hydraulic jack.

Each of these axle-engaging members may be made substantially like the other one, so that a description of one will suffice for both. The member has an axle-engaging portion and a portion to which a force (as an hydraulic jack) may be applied. The axle-engaging portion may have its upper end hooked, as indicated at 1, this hooked end engaging over an upper flange 94 of the axle 9. The hooked member then extends over the axle and down the opposite side, as indicated at 10, to a point where its edge engages the edge of a lower flange 99 of the axle, diagonally opposite the flange 94 engaged by the hook 1. Thence it extends beneath the axle, as indicated by the portion 11, and thence downwardly, merging into an arm to which force can be applied, as indicated by the portion 12, until it reaches a point on the same side of the axle as the hook 1, but beneath this point. Obviously, other forms may be adopted for the engagement of the axle, and those described are simply formed and easily applied and detached.

The two complemental members, being oppositely applied, each hooked end 1 engages the opposite side of the upper flange at 94, as already described, and at 94′, and each rear portion 10 engages an opposite side of the lower flange, 99 or 99′. Their lower ends are in adjacent planes, and in fact, their lower ends are preferably swelled somewhat out of the general plane of the members to overlap slightly, as may be seen in Figure 1, but are angularly spaced with respect to the axle. At their lower ends they are provided with means for engagement by the opposite ends of a jack 2; for instance, the base of the jack may be provided with a hook 20, and the plunger 21 of the jack is provided with a hook 22, each of these hooks 20 and 22 being received upon pins 30 and 3 received in or forming part of the lower end 12 of the hooked members. For one of these members A, the pin 3 may lie between bifurcations which make up the lower end 12, while the pin 30 of the other member B may project outwardly from the side of the member B, so that the axis of the jack 2 is in a plane normal to the axle between the points of engagement of the two members—that is, parallel to the general common plane of the two members and closely adjacent thereto.

It will be observed, in Figure 1 in particular, that the upper hooked ends 1 of these twisting members have their sides cut inwardly from the general plane of contact C between the two members, so that the sides of these hooks 1 engage the flanges 94 and 94′ at points which are spaced somewhat longitudinally of the axle, and this gives room for the twisting action. Their engagement with the lower flange 99 or 99′ is, however, along a considerable length of such flange, at opposite sides of their common plane of contact, such plane being normal to the axle.

Figure 2:
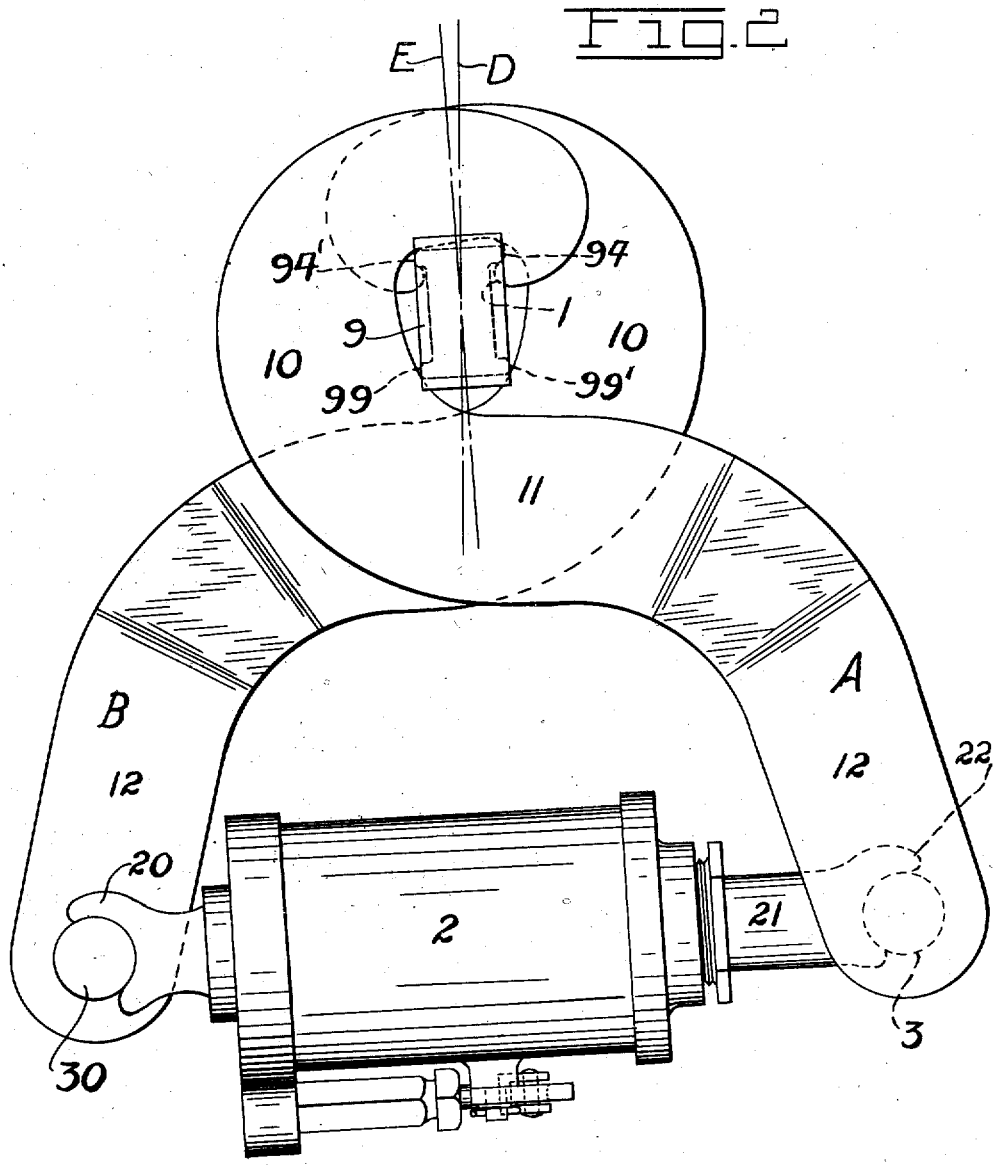
Figure 2 is an elevation of the same equipment from a viewpoint at the side of the car, the wheel and associated parts being omitted, and only the end of the axle being shown.

Now as the jack is expanded the lower legs 12 of the two members are separated, the points 99 and 99′ serving as fulcrums. This separation of the legs 12 causes angular movement of the axle-engaging members, one relative to the other, and a twisting of the axle from a general plane, as indicated at D in Figure 2, to such a plane as might be indicated by the line E. The wide fulcra at 99 and 99′, together with application of the force in a plane nearly if not quite coinciding with the plane of contact of the axle-engaging heads, and normal to both fulcra, produces true shear at the lower flange, and eliminates any sidewise slippage of the heads. To obtain a reverse twisting, the twisting members, would be applied with the member B nearer the outer end of the axle, in other words, reversed from the position shown in Figure 1, and it is for this reason that the pin 30 extends at opposite sides of the member B.

Such a device may be easily applied, each member separately, and without removing the wheel from the axle or the axle from the car. It is not necessary in most cases to support the car in any way except upon its wheels, and thus the device may be quickly and easily applied and the twisting done in a short time, the car being in such condition that it may be gauged readily and the amount of twisting determined.

What I claim as my invention is:

1. An axle twisting device comprising two members, each comprising a portion engageable with the sides and over the top of an axle, and an arm projecting therefrom, the axle-engaging portions being adapted to lie side by side in engagement with the axle, and slightly spaced longitudinally thereof, and the arms, when the respective axle-engaging portions are thus engaged with the axle, being spaced angularly about the axle, a support on one arm offset laterally from the plane of the corresponding axle-engaging portions, and jack means engaging said offset support and the other arm, and operable to vary the angular spacing of the two arms, and said jack means being movable in a plane substantially normal to the axle between the two axle-engaging portions.

2. An axle twisting device comprising two members each formed to engage the sides of an axle and means engageable with an upwardly facing surface to support the member therefrom, said means for the two members being so positioned that when the members are engaged with the axle said means are spaced lengthwise of the axle, and means to apply a force from one member to the other to produce relative movement of said members angularly about the axle, thereby twisting the axle between said members.

3. An axle twisting device comprising two arms each having a head formed to engage an axle, the heads when so engaged being disposed side by side along the axle, and the arms, when the heads are so disposed and engaged, being spaced angularly about the axle, with their ends terminating in parallel planes normal to the axle, a jack for engagement with the two ends to separate them, thereby to twist the axle between the heads, means projecting from the end of one arm towards the plane occupied by the end of the other arm, and complemental means disposed in the plane occupied by the end of the latter arm, the two ends of the jack being engageable respectively with the said two means, to be positioned thereby in a plane parallel to and closely adjacent to a plane (normal to the axle) which includes the portion of the axle to be bent, and lying between the respective heads.

4. Apparatus for changing the caster angle of the king pin hole of an axle, comprising two members each adapted to engage the forward and rear sides and an upwardly facing surface of the axle, and to be suspended, by reason of such engagement, side by side along the axle, each of said members having arms extending away from the axle, and, when the members are so engaged, being angularly spaced about the axle, and means to alter the angularity of such arms, thereby to twist one of said members relative to the other.

5. Apparatus for changing the caster angle of the king pin hole of an axle, comprising two members each adapted to engage the forward and rear sides and an upwardly facing surface of the axle, and to be disposed side by side along the axle, each of said members having arms extending away from the axle, and, when the members are so engaged, being angularly spaced about the axle, and power means acting from one arm to the other to angularly separate such arms, thereby to twist the associated members, each relative to the other.

6. An axle twisting device comprising a pair of complemental members each hooked at its upper end to engage over the edge of an upper flange of the axle, and its lower end lying at the same side of the axle and below such point of engagement, an intermediate portion engaging the edge of the lower flange at the opposite side of the axle, and a jack engaged with the two lower ends, and operable to separate them to apply a twisting stress.

7. An axle twisting device comprising a pair of complemental members, each having a hook at its upper end adapted to engage over an upper flange of an axle, thence extending over the top and down the opposite side of the axle to a bearing at the lower flange, thence extending beneath the axle and finally downward, the two complemental members being oppositely applied, whereby their hooks engage opposite sides of the top flange, and their lower ends extend in opposite directions, and a jack member engaged with each of said lower ends, and operable to separate them.

8. An axle twisting device as in claim 6, the two complemental members being each substantially planiform, and adapted to lie closely adjacent one another, and means at the lower end of each for engagement by the jack in a plane adjacent and parallel to the meeting plane of the two members.

9. An axle twisting device comprising a pair of complemental substantially planiform members each hooked at its upper end to engage the edge of an upper flange of the axle, the lower ends of each member lying at the same side of the axle as its respective hook, and therebelow, an intermediate portion of each member engaging the edge of the lower flange at the opposite side of the axle, the two members being reversely applied to the axle, whereby they lie substantially in contact, with their lower ends oppositely directed, the side faces of the hooked end of each member lying inward from the general planes of their side faces, whereby to space their points of engagement, longitudinally of the axle, and means for spreading apart the lower ends of said members, to apply a twisting stress to the axle.

10. An axle twisting device comprising two complemental members having upper ends engageable with opposite upper flanges of the axle, and each extending from such point of engagement over the axle and downward to a point of engagement at the diagonally opposite lower flange, and means operable between the lower ends of the members to move their upper ends together, the second point of engagement serving as a fulcrum.

11. An axle twisting device comprising a member having an axle-engaging portion and an arm projecting therefrom, means thereon engageable with the axle to suspend said member therefrom, a second member complemental to said first member and likewise having a projecting arm, and an axle-engaging portion, adapted to engage an axle adjacent to said first member, and means associated with said arms to move said members relatively to each other, thus to twist the axle.

12. An axle twisting device comprising two members, said members having axle-engaging portions disposed contiguously when applied to an axle, and each member having an arm projecting from the axle-engaging portion, the center lines of said two arm ends being spaced lengthwise of the axle when said axle-engaging portions are disposed in their contiguous, axle-engaging position, moving means disposed substantially in the plane of one arm and offset from the end of the other arm, and engaging means on said latter arm to engage said moving means.

CLAUDE C. BENNETT.